Nov. 12, 1940.  G. E. JAMES  2,221,191

WATER COLOR BOX

Filed Feb. 18, 1939   3 Sheets-Sheet 1

INVENTOR.
GORDON E. JAMES
BY Robert W. Wilson
ATTORNEY.

Nov. 12, 1940.    G. E. JAMES    2,221,191
WATER COLOR BOX
Filed Feb. 18, 1939    3 Sheets-Sheet 2
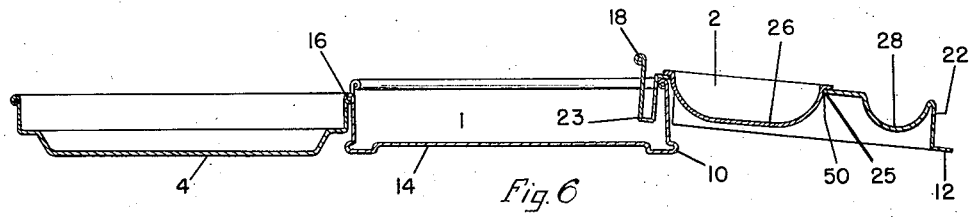
Fig. 6
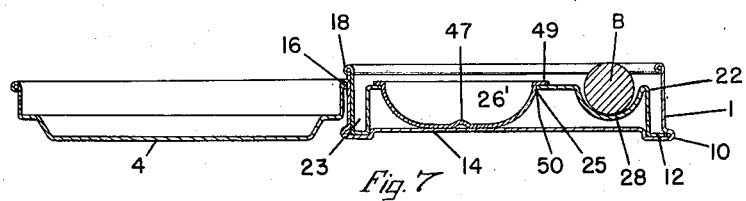
Fig. 7
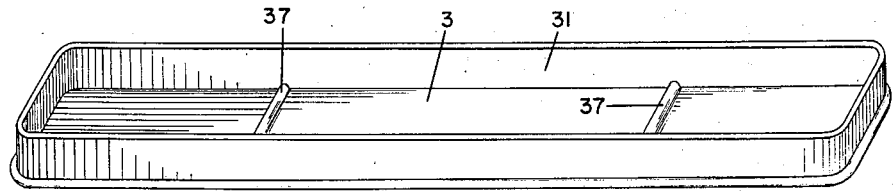
Fig. 8
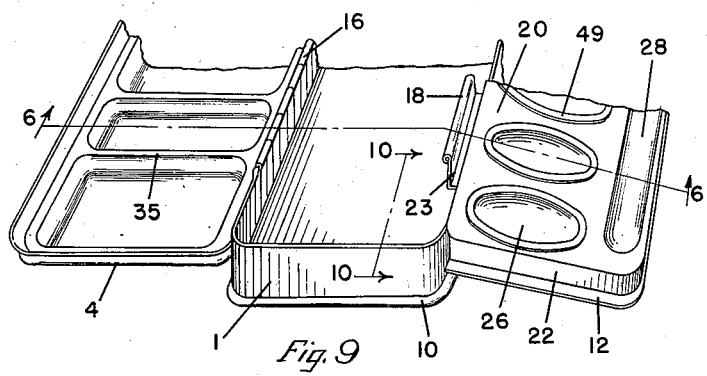
Fig. 9
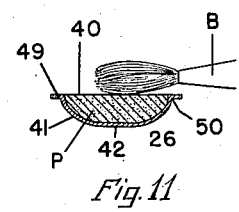
Fig. 11
Fig. 12
Fig. 13
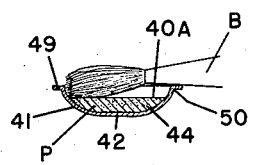
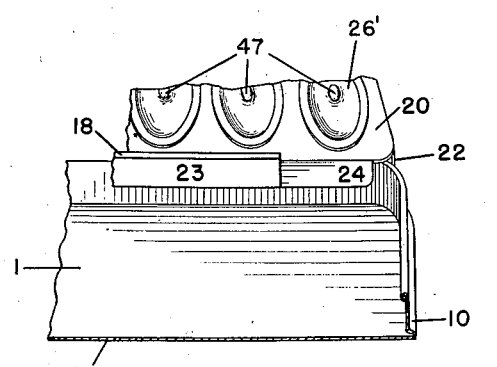
Fig. 10
INVENTOR.
GORDON E. JAMES
BY
Robert W. Wilson
ATTORNEY.

Nov. 12, 1940.  G. E. JAMES  2,221,191
WATER COLOR BOX
Filed Feb. 18, 1939  3 Sheets-Sheet 3

INVENTOR.
GORDON E. JAMES
BY Robert W. Wilson
ATTORNEY.

Patented Nov. 12, 1940

2,221,191

UNITED STATES PATENT OFFICE 2,221,191

WATER COLOR BOX

Gordon E. James, Sandusky, Ohio, assignor to The American Crayon Co., Sandusky, Ohio, a corporation of Ohio Application February 18, 1939, Serial No. 257,125

10 Claims. (Cl. 41—4)

This invention is in the field of water color paint boxes, and is directed to improvement of the entire assembly as well as individual features. Among the purposes are: an interfitting assembly which may optionally include or exclude a water pan and can be used either way, but in which the parts will fit snugly without looseness or rattle whether or not such water pan is present, and from which all parts can be separated and removed by accessible finger holds; an arrangement of parts which can be disassembled from packed position and reassembled in position for working, readily and without danger of cutting the fingers on any sharp edges; which affords ready finger access to remove the different parts and the brush; which includes color pans adapted to be snapped into and out of the tray, but holding firmly in place and avoiding chance of finger injury; providing color pans adapted to afford exposed paint surface in half pan at least equal to that given by full pans now on the market, which exposes such broad surface of paint at all states of volume remaining in the pan, even when nearly empty, but giving warning of approaching emptiness; to expose all paint to contact with the brush even when paint is down to the very bottom.

Furthermore, the invention is such that certain of the individual elements are adapted for separate use and for sale as distinct articles of commerce.

Certain of the features of the invention are particularly directed toward adapting it for school use, to meet conditions where limitations of class periods make it necessary to get the outfit ready for work quickly, and to put it away quickly. Another condition particularly desirable in the case of younger children is to combine ease of removal and replacement of parts with protection against any possible finger injury. Another condition to which this is directed is that the apparatus be of such a character that certain parts can be omitted without impairing the possibility of standardized production of the parts retained, and so that the omitted parts can, as desired, be added separately and still fit the assembly, thus enabling the invention to function as a painting set of greater or less completeness according to the more or less advanced status of pupils or the prices which can be afforded. Also, having school purposes particularly in view, the box is arranged for stacking.

Following the usual practice I describe below, and illustrate in the drawings, the preferred forms in which the principles of my invention may be embodied, and the disclosure is therefore to be taken as illustrative and not limiting.

In the drawings:

Fig. 6 is a transverse section on the plane 6—6 of Fig. 9, with parts set out for work;

Fig. 7 is the same section as Fig. 6, but with color tray nested in the box body;

Fig. 8 is a perspective of the water pan;

Fig. 9 is a partial perspective of the assembly set out ready for work, minus the water pan;

Fig. 10 is a perspective approximately from the point of view indicated by the arrows 10—10 of Fig. 9;

Figs. 11, 12 and 13 are sections through my improved color pan showing brush action on the paint therein at different stages of use.

Figure 5:
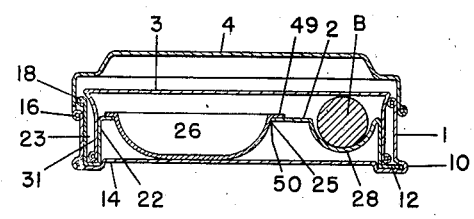
Fig. 5 is the same transverse vertical section as Fig. 4, including water pan.
Figure 14:
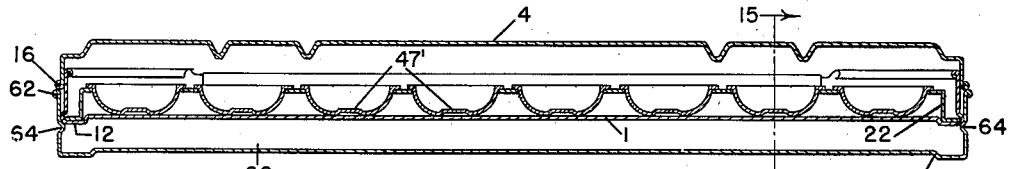
Fig. 14 is a longitudinal vertical section through a color box, lid closed, and with a modified water pan attached externally.
Figure 15:
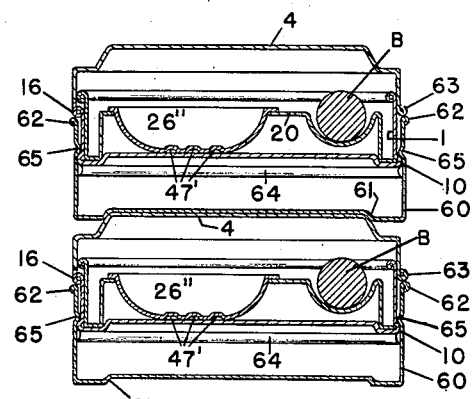
Fig. 15 is a transverse vertical section through two boxes with such modified pan attached, taken on the section 15—15 of Fig 14 looking in the direction of the arrows.
Figure 16:
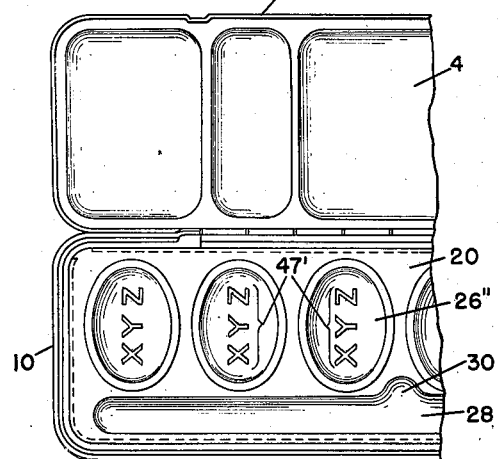
Fig. 16 is a partial plan view of a box with lid open, showing certain modifications.
Figure 17:
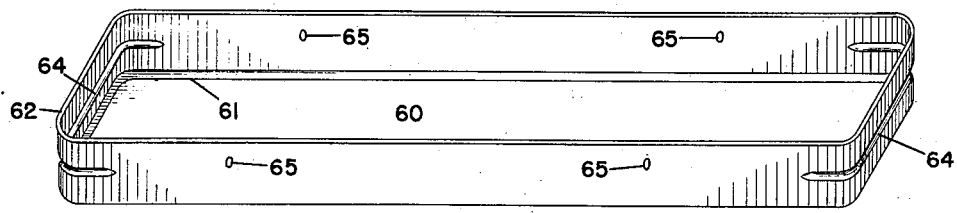
Fig. 17 is a perspective view of a modified water pan.

The complete assembly can best be seen by looking first at the transverse section, Fig. 5, herein the box proper is designated by reference character 1, the paint tray by reference character 2, the water pan by reference character 3, and the lid by reference character 4.

In the absence of a water pan the box 1 can be used to hold water, but if the water pan is included with the outfit, the box 21 may be used as a palette or mixing surface.

Figure 4:
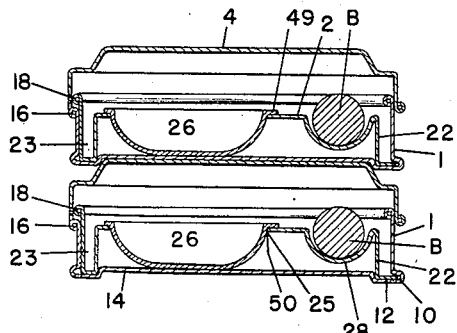
Fig. 4 is a transverse vertical section on plane 4—4 of Fig. 2, with lid closed, omitting the water pan and showing two boxes stacked.

The box body 1 is slightly beaded out continuously or at intervals along at least part of the bottom periphery as at 10, to receive outstanding flanges 12 of the paint tray 2, and thus hold the tray firmly in place, without rattle, whether the water pan 3 is included as in Fig. 5, or omitted as in Fig. 4. Preferably these flanges 12 are provided both at the front and ends of the paint tray. The depth of the body 1 is sufficiently greater than the height of the tray to allow the water pan 3 to be inserted and still have room for the brush B as in Fig. 5. The bottom is upwardly indented as at 14 to fit the lid of another box for stacking, Fig. 4. As best seen in Figs. 6 and 7, the lid hinge 16 is indented separately below the general level of the back edge of the box, so that an edge 18 of the paint tray will fit over and shield the hinge, and still be engageable thereabove for tray removal, as best seen in Fig. 7.

Figure 1:
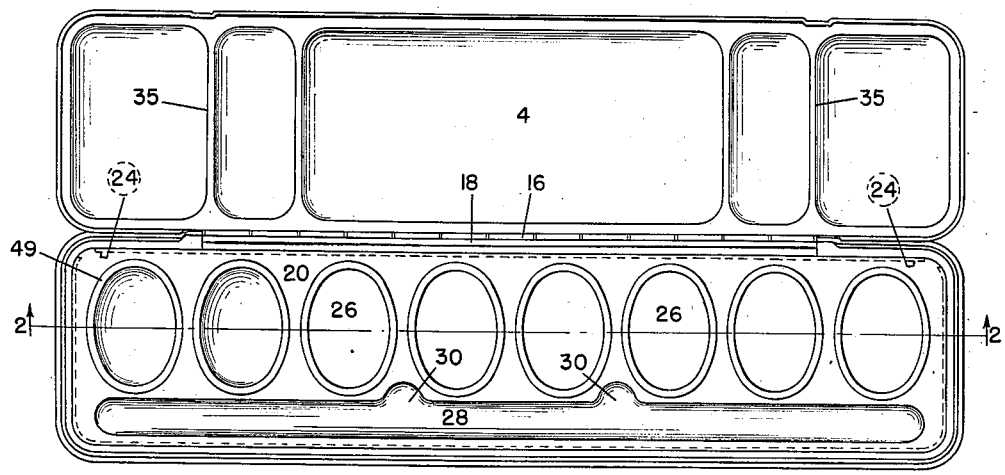
Fig. 1 is a plan view of my improved box, open, with water pan removed.
Figure 2:
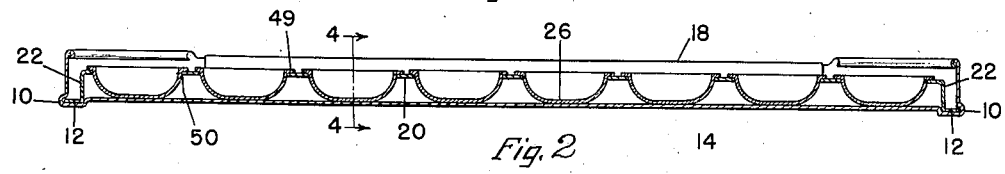
Fig. 2 is a partial longitudinal vertical section on plane 2—2 of Fig. 1, with water pan out.
Figure 3:
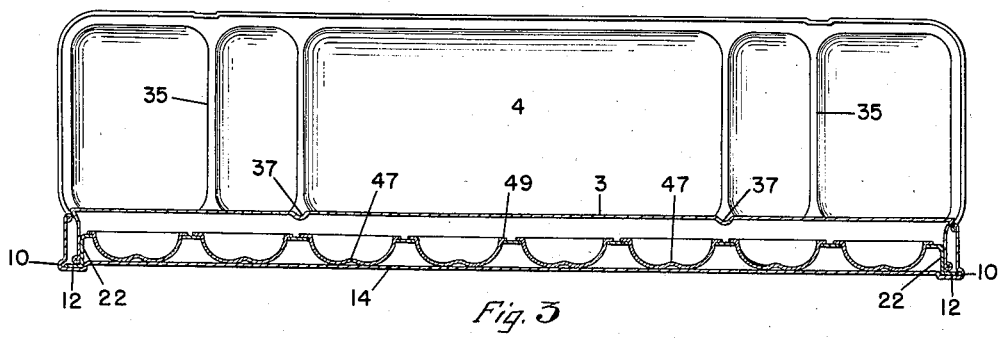
Fig. 3 is a partial longitudinal vertical section on plane 2—2 of Fig. 1, with water pan in place and lid partly open, and also showing a modified color pan.

The tray 2 comprises a generally flat platform 20 supported at front and ends by skirts 22 and at the back by the inner leg of channel 23, the longer outer leg of which is finished by the bead 18 previously mentioned. The inner leg of channel 23 is continued both ways as at 24, Figs. 1 and 10 to such a distance as to fit within the length of the front of the box, and thus prevent any substantial longitudinal movement of the tray when set up as in Fig. 9. The channel 23 has some natural resiliency or spreading tendency, thereby serving to bind the tray in the box. When the outfit is set up for work the channel is used to hook over the front edge of the box, Fig. 6, thus tilting the color pans slightly towards the user, fastening all parts except the water pan into a unitary assembly for use, and also to some extent conserving desk space.

The tray is appropriately perforated as at 25 for the insertion of the color pans 26 and is also grooved as at 28 along the front for the reception of a brush. Notches 30 adjacent to the groove permit the finger to make ready contact with the brush from behind, and level of the groove 28 is so related to the diameter of the brush handle and to the side of the front wall of the box 1 that the brush can readily be rolled out over the box front, as apparent from Fig. 7.

The box lid 4 is of conventional character, with transverse ridges such as 35, dividing it into compartments which can be used as separate mixing pans, as has long been the practice in boxes of this character. The top of the lid is narrowed to fit the stack indentation 14 in another box as shown in Fig. 4.

The water pan 3 is of proper dimensions to fit snugly over the skirts 22 and within the channel 23 of the paint tray, and of proper depth to just clear the brush. Since the water pan sides 31 are of somewhat resilient sheet metal and sized to fit the tray periphery snugly, the assembly, Fig. 5, is sufficiently tight to prevent movement of parts or rattle when the box is closed. It will be observed in Figs. 4 and 5 that the relative height of the brush channel 28 and the level of the bottom of the inverted water pan 3 are such that the brush B is also snugly held. In order to reduce rush of water from one end of the pan to the other if tilted, the pan bottom is transversely ridged as at 37 with the ridges at such longitudinal spacing as not to contact the thick part of the brush handle.

Figs. 14 to 18 inclusive illustrate certain modifications of my invention in which a larger water pan 60 is employed, which fits on the outside of the box 1 instead of inside. In this form of construction stacking may also be provided for, as by the bevel 61 recessing the bottom. The modified water pan 60 is arranged to fit snugly on the outside of the box body 1 of Figs. 1 to 10 and have a top edge 62 come up under the hinge 16 and beads 63 of the lid 4, thus forming a smooth neat assembly. Concave end beads or ridges 64 positively stop the descent of the box body 1 into the pan 60, thus preventing the lid from being lifted by the pan edges 62.

The same beads 10 on the front and ends of the body 1 which receive the feet 12 of the color tray 20 also catch beneath points 65 which together with the end ridges 64 securely fasten the pan 60 upon the box body 1. Consequently the same standardized box body is usable for either an inside or an outside water pan.

Some of the principles embodied in the foregoing assembly could be used with the conventional substantially rectangular color pans, but I have also invented an improved color pan which cooperates with the general purpose of making a water color outfit of special desirable character. Particularly, my improved color pan is shallower than a conventional color pan holding an equal quantity of paint, and the result is that the tray 20 can be made lower than where conventional rectangular pans are used, and thus give room for inclusion of the water pan in the closed box, Fig. 5, without necessity of deepening the box.

The color pan 26 is characterized by absence of any corners and by a contour which conforms to the natural shape of the usual water color paint brush, whatever the level of paint in the pan, as shown in Figs. 11, 12 and 13, where the paint P is successively full, half gone, and all gone.

On account of the large exposed area the pan is of standard capacity although relatively shallow. That is, the volume of paint is the same as that of the present rectangular color pan, as the case may be, now standard in the water color trade. As previously mentioned, the shallowness of the color pans 26 makes it possible to keep the tray 20 low enough to take the inverted water pan 3 beneath the box lid 4 without requiring a deeper box than is at present customary in the trade.

By reason of the wide top spread 40 of the pans 26 and the easy side curvature 41 sweeping into the bottom 42, the paint surface is always extensive in proportion to the paint volume. The present embodiment of the invention is one in which the pans hold a standard half pan quantity of paint but offer a standard full pan area. Thus, for example, in Fig. 12 where about half the volume of the paint P has been used, the surface 40A is not greatly diminished from the surface 40 of Fig. 11, and even at complete exhaustion, Fig. 13, the last vestige of paint is easily reached by the brush, none being caught in corners or along sharp edges.

To give warning that the pan is nearly empty the color pan may be made with a small bead 47 in the bottom, Figs. 7 and 10, to show above the surface when the paint is nearly exhausted. Here the color pan is designated as 26'. The principle of the warning bead may be embodied in embossed characters, a trade mark, or other legend, as indicated at 47' in the bottoms of the color pans 26'', Figs. 14, 15 and 16.

For convenient insertion and retention in the holes 25 of the tray 20, the color pan is flanged as at 49, and is vertical for a very short distance at 50 just below the flange to engage the thickness of the tray 20. The slight depth of the vertical portion 50 makes insertion and removal easy because of the very short relative travel required between tight fitting portions.

The fact that for a given volume of paint this pan exposes a large area is advantageous in that more of the paint is exposed to wetting and for contact with the brush than in rectangular pans. Water color paint has to be softened by wetting before it can be used, and if a broad moistened area is exposed to the brush, it is easier to get a brush full than if a smaller area is exposed; this is shown by Figs. 11 and 12. With the large surface, the paint which is moistened at the beginning of a school period is quickly available to fill the brush, saving time in starting.

Figure 18:
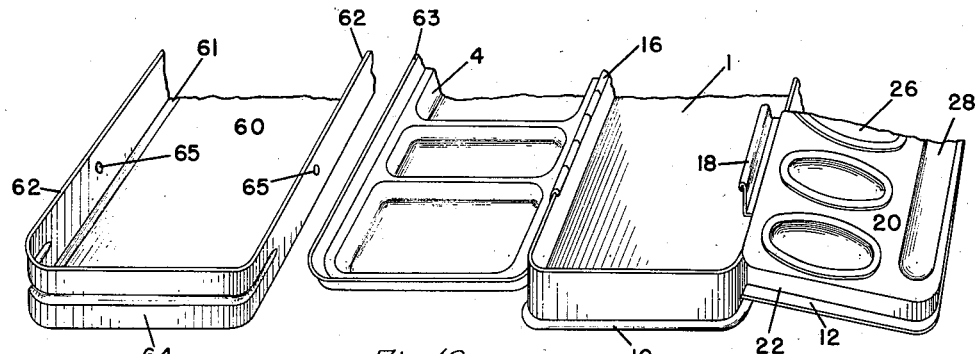
Fig. 18 is a perspective similar to Fig. 9 showing the entire assembly open for use, with the water pan in relation to the other parts.

My assembly can be used complete, setting it up as in Figs. 9 and 18 with the water pan conveniently placed, as in Fig. 18 but the assembly can be cheapened by omission of the water pan, using the box bottom for a water pan, as in Fig. 9. Then if desired the water pan can be purchased later and will fit either into the assembly or over the box, according to which style of pan is purchased, although the assembly is completely usable without the water pan. Or the tray 20 with or without the brush therein can be wrapped as an article of merchandise and still be usable, with other vessels to hold water and afford mixing surfaces. The color pans are also separately salable as replacements.

From the foregoing it will be seen that I have invented a water color box assembly in which the arrangement of parts, sizes and proportions are all suitable to fit together as a unitary assembly, snugly and without rattle, but that parts may be either omitted or added without detracting from the effective co-action of the other parts. The box proper may be used with either of two styles of water pan. The entire set is attractive in appearance both internally and externally, compact in shape, and includes features which particularly adapt it for school use.

Certain preferred forms of the invention have been described above but it will be understood that the scope is to be measured by the following claims rather than by the description.

I claim:

1. In an assembly of the character described, in combination, an outer box, a lid hinged along one edge thereof, and a tray of less height than the depth of said box fitting therein, a descending skirt on the rear edge of said tray, and an outside flange upstanding from the bottom of said skirt to above the hinge of said outer box, said flange being sprung outwardly to engage the rear wall of said outer box resiliently.

2. In an assembly of the character described, in combination, an outer box, a lid hinged along one edge thereof, and a tray of less height than the depth of said box fitting therein, a descending skirt on the rear edge of said tray, and an outside flange upstanding from the bottom of said skirt to above the hinge of said outer box, said flange being sprung outwardly to engage the rear wall of said outer box resiliently, and an outwardly directed bead on the upper edge of said flange overlapping said hinge.

3. In an assembly of the character described, in combination, an outer box, a lid hinged along one edge thereof, and a tray of less height than the depth of said box fitting therein, color pans suspended in said tray, said pans being characterized by shallow depth relative to the volume of color contained therein and by sides formed in easy curves in vertical section and in plan, a descending skirt on the rear edge of said tray, and an outside flange upstanding from the bottom of said skirt to above the hingle of said outer box, said flange being sprung outwardly to engage the rear wall of said outer box resiliently.

4. In an assembly of the character described, in combination, an outer box, a lid hinged along one edge thereof, and a tray of less height than the depth of said box fitting therein, color pans suspended in said tray, said pans being characterized by exposing at all stages of fullness an area of paint approximately double that exposed by a standard rectangular pan of equal content, a descending skirt on the rear edge of said tray, and an outside flange upstanding from the bottom of said skirt to above the hinge of said outer box, said flange being sprung outwardly to engage the rear wall of said outer box resiliently, and an outwardly directed bead on the upper edge of said flange overlapping said hinge.

5. An insert for color boxes comprising a flat-topped tray, a plurality of color pans suspended therein, skirts on the front and rear edges of said tray descending to below the bottom level of said color pans, said pans being characterized by standard half-pan volume combined with exposure of full pan area of color, said tray being of the same length as a tray carrying an equal number of standard rectangular half pans, said pans being of substantially elliptical shape with major axes transverse to the tray and substantially greater than the corresponding dimension of a half pan, a brush-receiving groove for a single brush in said tray occupying the space between the color pans and said front skirt, the width of said tray being taken up by the major color pan dimension plus width of a groove fitting a single brush.

6. An insert for color boxes comprising a flat-topped tray, color pans suspended in said tray, skirts on the front and rear edges of said tray descending to below the bottom level of said color pans, and a flange rising from the bottom of said rear skirt to above the level of said color pans.

7. An insert for color boxes comprising a flat-topped tray, color pans suspended in said tray, skirts on the front and rear edges of said tray descending to below the bottom level of said color pans, a brush-receiving groove in said tray between the color pans and said front skirt, and a flange rising from the bottom of said rear skirt to above the level of the color pans.

8. An insert for color boxes comprising a flat-topped tray, color pans of elliptical shape in plan suspended in said tray, supporting descending resilient skirts on the front and rear edges of said tray, a brush-receiving groove in said tray between the color pans and said front skirt, finger grooves extending transversely and rearwardly out of said brush groove and into spaces between the front ends of adjacent pans.

9. A water color pan of generally elliptical shape in plan, and with sides which on every vertical section are curved to a radius not substantially less than the outside diameter of the tuft of a standard water color brush, whereby such a brush without substantial distortion will contact every particle of color in the pan.

10. A water color pan of generally varying curvature in every horizontal and every vertical section, the horizontal curvature approximately conforming to the shape in axial section of a water color brush and the vertical curvature approximately conforming to the shape in major transverse section of such brush.

GORDON E. JAMES.